US007200714B2

(12) United States Patent
Ben-Haim et al.

(10) Patent No.: US 7,200,714 B2
(45) Date of Patent: Apr. 3, 2007

(54) CONCATENATED MULTI-DIMENSIONAL ASSOCIATIVE SEARCH ENGINES

(75) Inventors: Yaniv Ben-Haim, Tikva (IL); Moshe Stark, Yehuda (IL)

(73) Assignee: HyWire Ltd., Netanya (IL)

( * ) Notice: Subject to any disclaimer, the term of this patent is extended or adjusted under 35 U.S.C. 154(b) by 495 days.

(21) Appl. No.: 10/876,579

(22) Filed: Jun. 28, 2004

(65) Prior Publication Data
US 2005/0004908 A1 Jan. 6, 2005

Related U.S. Application Data

(60) Provisional application No. 60/482,490, filed on Jun. 26, 2003.

(51) Int. Cl.
*G06F 12/00* (2006.01)
(52) U.S. Cl. ............................... 711/108; 707/3; 707/6; 365/49
(58) Field of Classification Search ...................... None
See application file for complete search history.

(56) References Cited

U.S. PATENT DOCUMENTS

2004/0083336 A1    4/2004    Stark

OTHER PUBLICATIONS http://www.networksystemsdesign.com/English/Collaterals/Press_Releases/2002/20021014_Cypress_Vichara.pdf    "Cypress Announces Industry's First Search Supervisory Coprocessor, Providing Comprehensive Search-System Management".

Pending U.S. Appl. No. 10/315,006 filed on Dec. 10, 2002 "Multi Dimensional Associative Search Engine".

*Primary Examiner*—Hyung Sough
*Assistant Examiner*—Jasmine Song
(74) *Attorney, Agent, or Firm*—Mark M. Friedman

(57) ABSTRACT

A packet co-processing system for improving the performance of an Application Specific Integrated Circuit (ASIC), including: a set of N search engines, logically disposed so as to form a chain of search engines, including: (a) a first search engine for connecting to the ASIC; (b) a terminal search engine, and (c) a set of N−2 intermediate search engines, logically disposed between the first search engine and the terminal search engine (N=2), and wherein each particular search engine includes: (i) an input selector including a parsing unit configured to: (A) select a particular set of fields containing at least a portion of at least one field from a larger, first set of fields submitted to the particular search engine, and (B) produce a Synthesized Key using data from the particular set of fields; (ii) search logic configured to: (A) search a memory, in response to the Synthesized Key, for a key entry matching the Synthesized Key, and (B) retrieve associated data corresponding to the Synthesized Key, and (iii) an output unit for outputting the associated data from the particular search engine, and wherein each output unit of each intermediate search engine, and at least one output unit of the first search engine and the terminal search engine, output the associated data to an adjacent search engine, and wherein the input selector of each intermediate search engine, and at least one input selector of the first search engine and the terminal search engine, output a second set of fields, including at least a portion of the first set of fields, to an adjacent search engine.

38 Claims, 10 Drawing Sheets

CONCATENATED MULTI-DIMENSIONAL ASSOCIATIVE SEARCH ENGINES

This application draws priority from U.S. Provisional patent application Ser. No. 60/482,490, filed Jun. 26, 2003.

FIELD AND BACKGROUND OF THE INVENTION

The present invention relates to a system and method for searching input keys, and, more particularly, to a system of concatenated Associative Search Engines (ASEs) and a method of integrating the ASEs to enable high-performance searching of multiple-field or multi-dimensional keys.

The use of external memories, in particular DRAMs, to increase the storage capacity of a generic ASE, and in particular, the Range Search Engine (RSE) of HyWire Ltd., was disclosed in a co-pending U.S. patent application (Ser. No. 10/688,986) entitled "Multi-Dimensional Associative Search Engine Having An External Memory", which is incorporated by reference for all purposes as if fully set forth herein. The external memories are controlled by a Memory Control Logic, which can be located inside or outside the RSE, and are connected to the RSE via a Control & Data Bus (CDB).

The RSE-chained coprocessor is connected to a Network Processing Unit (NPU); it provides a unique and flexible way of parsing the packet headers of the incoming packets according to a set of rules determined by the NPU, concurrently performing several search operations on the parsed information in different memory tables, and combining the search results. These results can be used for high-performance packet forwarding, classification, security, accounting and billing, statistics, etc., thus significantly offloading the NPU, as all these (and in particular packet classification) are processor-intensive tasks.

In some state-of-the-art configurations of coprocessors operating with NPUs, several search engines or coprocessors are used in parallel to search multiple-field keys, each engine being designed to handle one or more fields of these keys. The relevant multiple-field key (or keys) must be parsed and submitted to each search engine, and the result signals arriving from each engine must be processed. Such an architecture requires a large number of input/output pins in the NPU, makes inefficient use of the bus bandwidth, and loads the NPU.

One alternative to reduce the pin count and improve the bus bandwidth utilization in the NPU is the use of a Supervisory Coprocessor, as shown in FIG. 1a. The Supervisory Coprocessor receives data packets from the NPU, and distributes tasks to a plurality of ASEs. This coprocessor may parse the packet headers of the incoming packets (instead of the NPU) according to a set of rules determined by the NPU. The ASEs can concurrently perform search operations on the parsed information in different memory tables, and transfer the search results to the Supervisory Coprocessor, which may combine them and provide the combined result to the NPU. In this configuration, the Supervisory Coprocessor offloads the NPU of the packet header parsing and the search result combination.

One commercial version of this configuration, schematically depicted in FIG. 1b, utilizes the Vichara™ 81000 Search Supervisory Coprocessor (disclosed by Cypress Semiconductor Corporation, "Cypress Announces Industry's First Search Supervisory Coprocessor, Providing Comprehensive Search-System Management", The design is relatively complex, and appears merely to shift the problems of excessively-large pin count and inefficient use of bus bandwidth from the NPU to the Search Supervisory Coprocessor. The use of a supervisory coprocessor, disposed inside or outside the NPU, requires a powerful driver having a large fan-out to drive all the ASEs, or several individual drivers for one or more ASEs. This configuration also requires a complex multiplexer to combine and synchronize the outputs of all the ASEs for integrated high-performance complex search operations required for multi-dimensional classification, forwarding, content search, etc.

There is therefore a recognized need for, and it would be highly advantageous to have, a packet co-processing system of linked Associative Search Engines (ASEs) and a method of integrating the ASEs that enable high-performance searching of multiple-field or multi-dimensional keys, through efficient use of bus bandwidth and without an excessive pin-count requirement.

SUMMARY OF THE INVENTION

The present invention is a packet co-processing system for improving the performance of an Application Specific Integrated Circuit (ASIC).

According to the teachings of the present invention there is provided a packet co-processing system for improving the performance of an Application Specific Integrated Circuit (ASIC), including: a set of N search engines, logically disposed so as to form a chain of search engines, the set of search engines including: (a) a first search engine for connecting to the ASIC; (b) a terminal search engine, operatively connected with the first search engine, and (c) a set of N−2 intermediate search engines, logically disposed between the first search engine and the terminal search engine, wherein N is an integer=2, and wherein each particular search engine in the chain of search engines includes: (i) an input selector including a parsing unit configured to: (A) select a particular set of fields containing at least a portion of at least one field, from a larger, first set of fields submitted to the particular search engine, and (B) produce a Synthesized Key using data from the particular set of fields; (ii) search logic configured to: (A) search a memory, in response to the Synthesized Key, for a key entry matching the Synthesized Key, and (B) retrieve, from the memory, associated data corresponding to the Synthesized Key, and (iii) an output unit configured to output the associated data from the particular search engine, wherein the chain is further configured such that each output unit of each intermediate search engine, and at least one output unit of the first search engine and the terminal search engine, output the associated data to an adjacent search engine in the chain, and wherein the chain is further configured such that the input selector of each intermediate search engine, and at least one input selector of the first search engine and the terminal search engine, output a second set of fields, including at least a portion of the first set of fields, to an adjacent search engine in the chain.

According to further features in the described preferred embodiments, N=2, and the terminal search engine is directly connected to the first search engine.

According to still further features in the described preferred embodiments, N>2, and the intermediate search engine of the intermediate search engines is directly connected to the first search engine.

According to still further features in the described preferred embodiments, N>2, and solely one intermediate search engine of the intermediate search engines is directly connected to the first search engine.

According to still further features in the described preferred embodiments, N>2, and the terminal search engine is directly connected to a preceding search engine of the intermediate search engines.

According to still further features in the described preferred embodiments, each output unit of each intermediate search engine, and at least one output unit of the first search engine and the terminal search engine, includes an output multiplexer & synchronizer (OMS).

According to still further features in the described preferred embodiments, up to two of the first, intermediate, and terminal search engines are for directly connecting to the ASIC.

According to still further features in the described preferred embodiments, the terminal search engine is directly connected solely to one search engine of the intermediate search engines.

According to still further features in the described preferred embodiments, the terminal search engine is directly connected to the ASIC, such that the output unit of the terminal search engine is configured to output the associated data from the terminal search engine, via an output bus, directly to the ASIC.

According to still further features in the described preferred embodiments, the output unit of the terminal search engine is configured to output the associated data from the terminal search engine, via an output bus, to an immediately preceding search engine in the chain of search engines.

According to still further features in the described preferred embodiments, the first search engine is directly connected to a single search engine.

According to still further features in the described preferred embodiments, the first set of fields and the second set of fields are identical.

According to still further features in the described preferred embodiments, the second set of fields contains all of the first set of fields.

According to still further features in the described preferred embodiments, the ASIC is a network processing unit (NPU).

According to still further features in the described preferred embodiments, a particular OMS of a particular search engine in the chain of search engines is designed and configured to multiplex and synchronize the associated data from at least one preceding search engine in the chain with the associated data from the particular search engine so as to produce a concatenated set of results.

According to still further features in the described preferred embodiments, the output unit of the particular search engine is configured to output the concatenated set of results to an adjacent search engine in the chain.

According to still further features in the described preferred embodiments, the search logic of the adjacent search engine is configured to search at least a portion of the concatenated set of results.

According to still further features in the described preferred embodiments, the parsing unit includes programmable registers.

According to still further features in the described preferred embodiments, the parsing unit includes programming files.

According to still further features in the described preferred embodiments, the memory of the first search engine and the memory of the terminal search engine are dedicated memories that serve a single search engine.

According to still further features in the described preferred embodiments, the memory of any particular search engine is disposed within the particular search engine.

According to still further features in the described preferred embodiments, the memory of any particular search engine is disposed outside of the particular search engine.

According to still further features in the described preferred embodiments, the input selector is designed and configured to output the second set of fields before, or in parallel with, production of the Synthesized Key.

According to still further features in the described preferred embodiments, the input selector is designed and configured to output the second set of fields within a few clock cycles, such that the output of the second set of fields is completed before, or in parallel with, production of the Synthesized Key.

According to still further features in the described preferred embodiments, the data corresponding to the Synthesized Key includes field location data.

According to still further features in the described preferred embodiments, the first search engine, terminal search engine and the set of intermediate search engines have an identical hardware structure.

According to still further features in the described preferred embodiments, the first set of fields includes a multiple-field Packet Header Key.

According to still further features in the described preferred embodiments, the first search engine, each intermediate search engine, and the terminal search engine are logically disposed in a forward result concatenation configuration, wherein search results obtained in each search engine, starting from the first search engine, are transferred forward to an immediately succeeding search engine, and wherein the OMS of the succeeding search engine is designed and configured to multiplex and synchronize the search results with search results from the succeeding search engine to produce a concatenated set of results, which are then output to a next immediately succeeding search engine.

According to still further features in the described preferred embodiments, the terminal search engine is configured to output concatenated results to the ASIC.

According to still further features in the described preferred embodiments, the first search engine, each intermediate search engine, and the terminal search engine are logically disposed in a backward result concatenation configuration, wherein search results obtained in each search engine, starting from the terminal search engine, are transferred backward to an immediately preceding search engine, and wherein the OMS of the preceding search engine is designed and configured to multiplex and synchronize the search results with search results from the preceding search engine to produce a concatenated set of results, which are then output to a next immediately preceding search engine.

According to still further features in the described preferred embodiments, the first search engine is configured to receive concatenated results from a succeeding search engine in the chain, and wherein an OMS of the first search engine is designed and configured to multiplex and synchronize search results with the concatenated results from the succeeding search engine to produce a concatenated set of results, and to output the concatenated set of results to the ASIC.

The present invention successfully addresses the shortcomings of the existing technologies by providing a system of linked Associative Search Engines (ASEs) and a method of integrating the ASEs that enable high-performance searching of multiple-field or multidimensional keys through efficient use of bus bandwidth and without an excessive pin-count requirement.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1A:
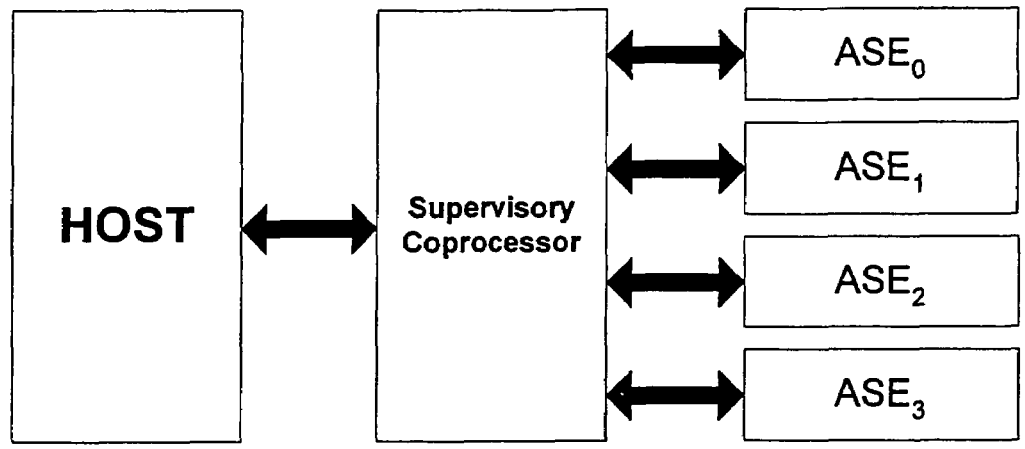
FIG. 1a is a schematic diagram of a prior-art co-processing system having a Supervisory Coprocessor directly connected to the NPU.
Figure 1B:
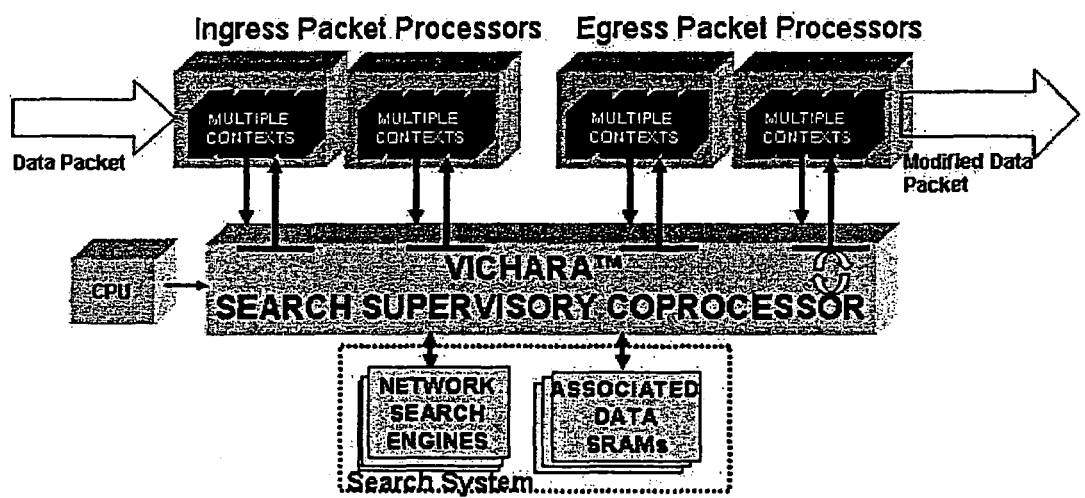
FIG. 1b is a schematic diagram of another prior-art co-processing system having a Supervisory Coprocessor connected to the NPU by a packet pre-processor.

The present invention is a packet co-processing system for improving the performance of an Application Specific Integrated Circuit (ASIC), of which a Network Processing Unit (NPU) is a common example.

The principles and operation of the concatenated multi-dimensional associative search engine according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawing. The invention is capable of other embodiments or of being practiced or carried out in various ways. Also, it is to be understood that the phraseology and terminology employed herein is for the purpose of description and should not be regarded as limiting.

Figure 2:
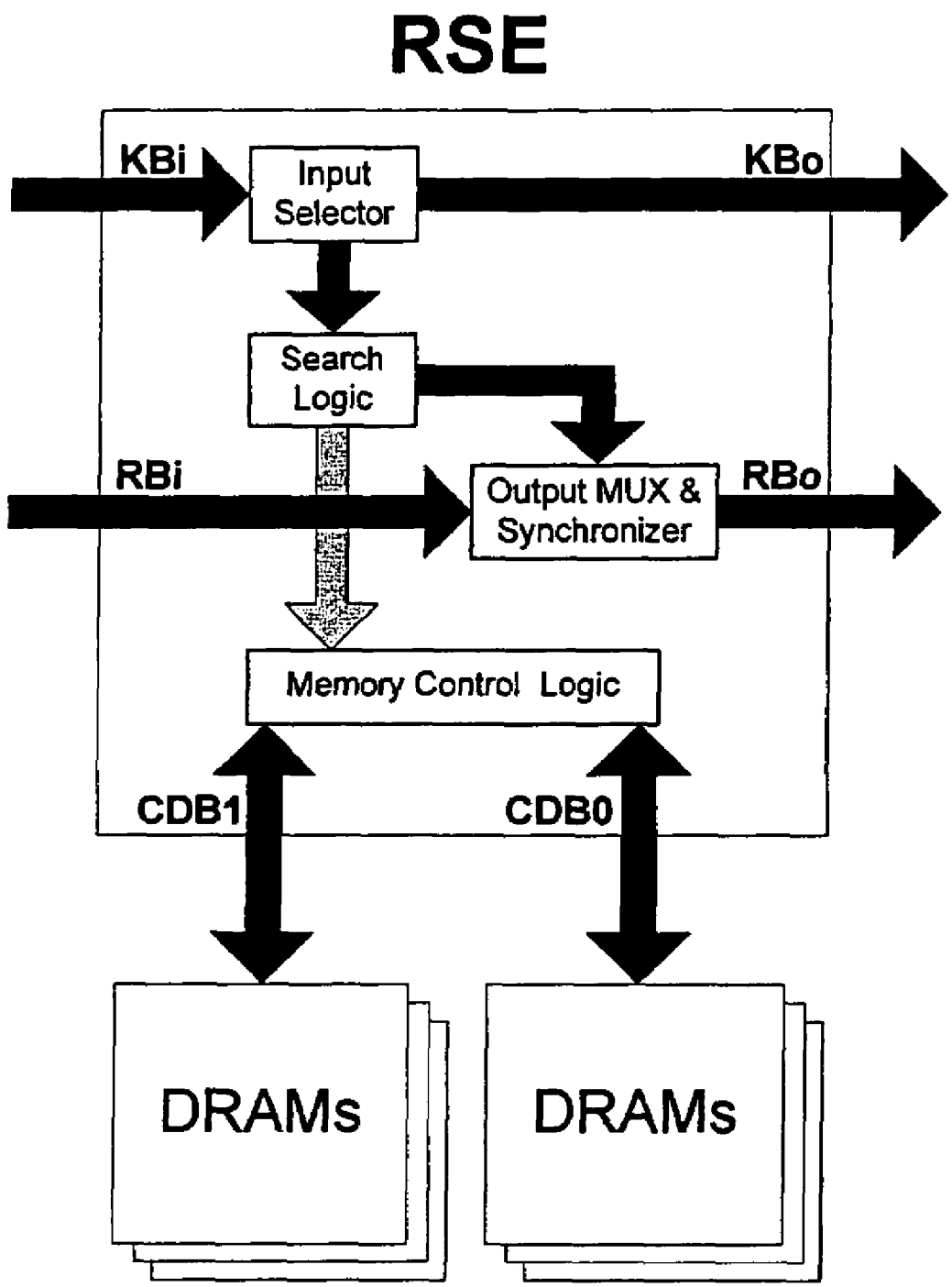
FIG. 2 is a basic block diagram of an exemplary modular RSE for use in a concatenated chain, according to the present invention.

FIG. 2 is a basic block diagram of an exemplary modular RSE for use in a concatenated chain, according to the present invention. Each modular RSE includes an Input Selector, Search Logic, an Output Multiplexer (MUX) & Synchronizer (OMS) and Memory Control Logic. Preferably, all the RSEs in the chain have the same structure, but they are configured for parsing differently the packet headers and searching different multiple-field Packet Header Keys (PHKs). This parsing is performed by the Input Selector using programmable registers or programming files, which define the limits of the fields within the keys.

The RSE is an example of an Associative Search Engine (ASE), which is a prominent example of a Search Engine. As used herein in the specification and in the claims section that follows, the term "Associative Search Engine" refers to a Search Engine having a memory containing Key Entries and Associated Data Entries that uniquely correspond to these Key Entries, the search engine designed and configured to search within the memory, in response to a submitted key, and to retrieve Associated Data corresponding to the submitted key.

An Input Key Bus (KBi) carries commands and submitted keys from the NPU to all the RSEs. The Input Selector includes a Parsing Unit that selects the pertinent fields of the submitted key (or, more generally, submitted data) to be searched by the specific RSE, and passes on all the commands and at least a portion of the submitted keys to the succeeding RSE on an Output Key Bus ($KB_0$). It is usually preferable for the Input Selector to pass on the entire submitted key, such that the succeeding RSE can commence processing in parallel to the processing taking place in the preceding RSE.

The Parsing Unit receives the selected fields, including Packet Field Descriptor (PFD) pointers or indices. Each of these PFD indices is used to select a portion (typically one row) of a PFD Table that specifies the field serial number, starting location and field length assigned to each selected field. The selected fields are arranged in an orderly fashion so as to form a Synthesized Key.

As used herein in the specification and in the claims section that follows, the term "preceding", with respect to a particular search engine, refers to a search engine that is logically-disposed adjacent to the particular search engine, between the particular search engine and the ASIC.

As used herein in the specification and in the claims section that follows, the term "succeeding", with respect to a particular search engine, refers to a search engine that is logically-disposed adjacent to the particular search engine, away from the ASIC, and towards the terminal search engine.

As used herein in the specification and in the claims section that follows, the term "adjacent", with respect to a particular search engine, refers to a preceding or a to a succeeding search engine.

As used herein in the specification and in the claims section that follows, the term "Synthesized Key" refers to a key that includes a set having at least a portion of one or more fields, selected by a dedicated parsing unit from a larger set of fields.

As used herein in the specification and in the claims section that follows, the term "dedicated parsing unit" refers to a parsing unit that is configured to parse, for a single search engine, submitted data. Typically, the submitted data includes a set of fields, often in the form of a Packet Header or group of Packet Headers.

Each PFD Table can be assigned to a different RSE in the chain. The PFD Table (or a programming file, if used) is generated by a CPU located within the NPU or externally (e.g., in a Control Plane). Table 1 is an exemplary format of a PFD Table with 16 indices, which can specify up to 16 different Synthesized Keys. Each Synthesized Key in this table contains Q fields and one Configuration Flag. Each field is specified by its start location and length (designated "Strt" and "Lngt" in Table 1). The flag specifies the type of events or tasks to be handled by the RSEs (e.g., lookup or result, type of lookup—Exact or Range, instant lookup execution or delay until result of previous lookup is returned, etc.). In this example, the flag is common to all the fields in the Synthesized Key. In a more general format, a particular Configuration Flag can be associated with each field, providing additional flexibility.

results of the specific RSE with the search results of all the previous RSEs arriving on an Input Result Bus (RBi), to provide a concatenated set of results to the following RSE on an Output Result Bus (RBo).

Each RSE is designed and configured for Key Synthesis, which refers to the process of parsing multiple-field keys in each RSE by selecting specific fields of these keys and ordering the keys according to pointers supplied with the selected fields so as to obtain a Synthesized Key. The selected fields are sequentially searched in lists of keys stored in the Search Logic memory; each search points to a location in an internal memory or an external DRAM connected to the RSE. If a key is found, a corresponding Index or Associated Data is retrieved as a result; this result, along with a Hit/Miss (or Match/No-Match) indication, is concatenated with other search results to determine the actions to be performed on the selected fields.

While all the RSEs preferably have an identical structure, each specific RSE is configured for searching different multiple-field Packet Header Keys (PHKs), e.g., IPv4 CIDR addresses, IPv6 addresses, MAC addresses, MPLS labels, etc. An RSE can be configured to concurrently handle one or more PHKs.

An example of a Key Synthesis procedure applied to a single PHK, such as an IPv4 Classification Key shown in

TABLE 1

PFD Table Format in a Programmable Register Used to Specify the Synthesized Keys aand Concatenated Results

| | Synthesized Key Fields | | | | | | | | Concatenated Result Fields | | | | | | | |
|---|---|---|---|---|---|---|---|---|---|---|---|---|---|---|---|---|
| PFD Index | Field #0 | | Field #1 | | — | Field #Q-1 | | Config Flag | Result #0 | | Result #1 | | — | Result #R-1 | | Config Flag |
| | Strt | Lngt | Strt | Lngt | Strt Lngt | Strt | Lngt | | Strt | Lngt | Strt | Lngt | Strt Lngt | Strt | Lngt | |
| 0000 | | | | | | | | | | | | | | | | |
| 0001 | | | | | | | | | | | | | | | | |
| — | | | | | | | | | | | | | | | | |
| 1110 | | | | | | | | | | | | | | | | |
| 1111 | | | | | | | | | | | | | | | | |

In a similar way, each Concatenated Result in Table 1 contains R fields (where in general R≠Q) and one Configuration Flag. The flag specifies the type of results corresponding to the handled events (e.g., whether the result concatenation is enabled, whether this concatenation depends on Hit/Miss (or Match/No-Match) results, whether previous lookup results must be used in the current lookup). In general, a particular Configuration Flag can be associated with each Concatenated Result field, which provides additional flexibility.

As mentioned above, the NPU determines, by means of PFD Tables or programming files, the events or tasks to be handled by the RSEs. In the simplest case, a single default PFD index can be used to specify unrelated tasks for different RSEs. The RSE structure disclosed herein may be used for parsing and searching any string of keys, not necessarily in a Packet Header format.

Figure 3:
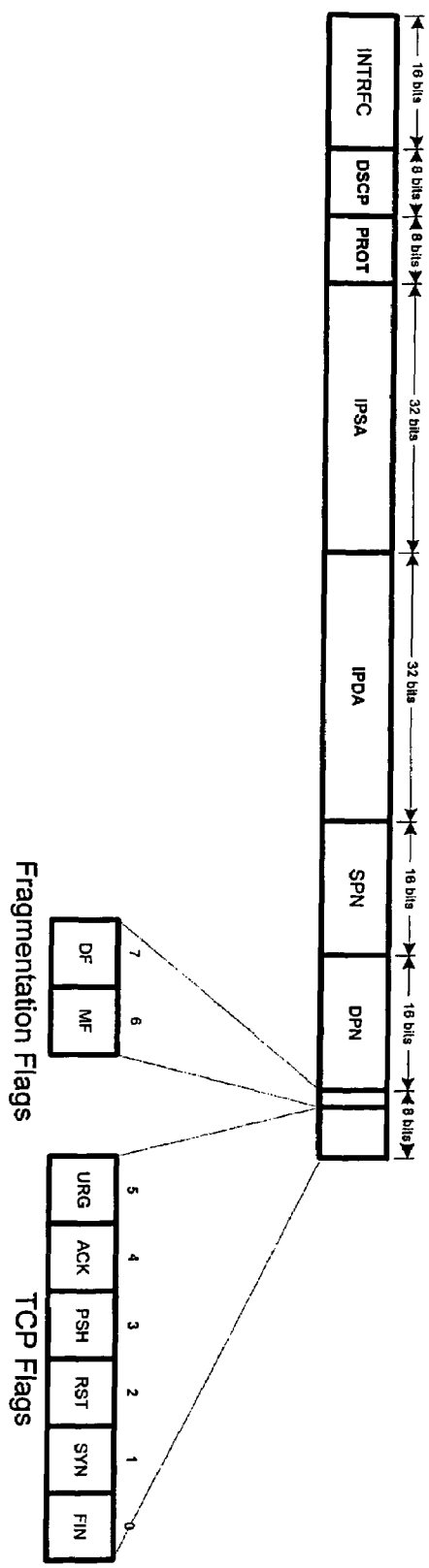
FIG. 3 shows an IPv4 Classification Key as an example of a known Packet Header Key (PHK)

The fields of the Synthesized Key are sequentially searched in lists of keys stored in the Search Logic, each search pointing to a location in a memory (internal memory or an external DRAM connected to the RSE) where the search is completed. If a key is found in the memory, the corresponding Index or Associated Data is retrieved as a result. The OMS multiplexes and synchronizes the search FIG. 3, consists of selection of PHK fields and ordering of the selected fields according to the PFD pointers or indices by the Parsing Unit in the Input Selector. Each of these pointers is used to select one of several PFD Tables that specify the serial number, starting location and length assigned to each selected field. These tables determine the location of the selected fields within the Synthesized Key.

Each RSE is designed and configured for searching the fields of the Synthesized Keys in the memories (internal memories or the external DRAMs connected to the chained RSEs) and for concatenating or combining the search results so as to provide an integrated result to the NPU.

The RSE chain can perform multiple-task operations, in which each field or dimension is searched independently of other dimensions, each search result being unrelated to other results. More importantly, the RSE chain can also perform multi-dimensional search operations (where the concatenated results are "Cartesian multiplications" of one-dimensional results). A method for searching multi-dimensional keys in multidimensional ranges for packet classification was disclosed in U.S. patent application (Ser. No. 10/315, 006) entitled "Multi-Dimensional Associative Search Engine", which is incorporated by reference for all purposes as if fully set forth herein. Multi-dimensional search involves searching each field of the submitted Key in an RSE, finding the searched field in a memory and retrieving Associated Data or a Tag in response. Each retrieved Associated Data or Tag is concatenated with the following field, and the concatenated key is searched in the next RSE. The Associated Data issued by the last RSE in the chain defines the Classification Rules or actions to be performed on the selected packet. The concatenation of these results is performed sequentially in each RSE by means of an Output MUX & Synchronizer (OMS).

Figure 4:
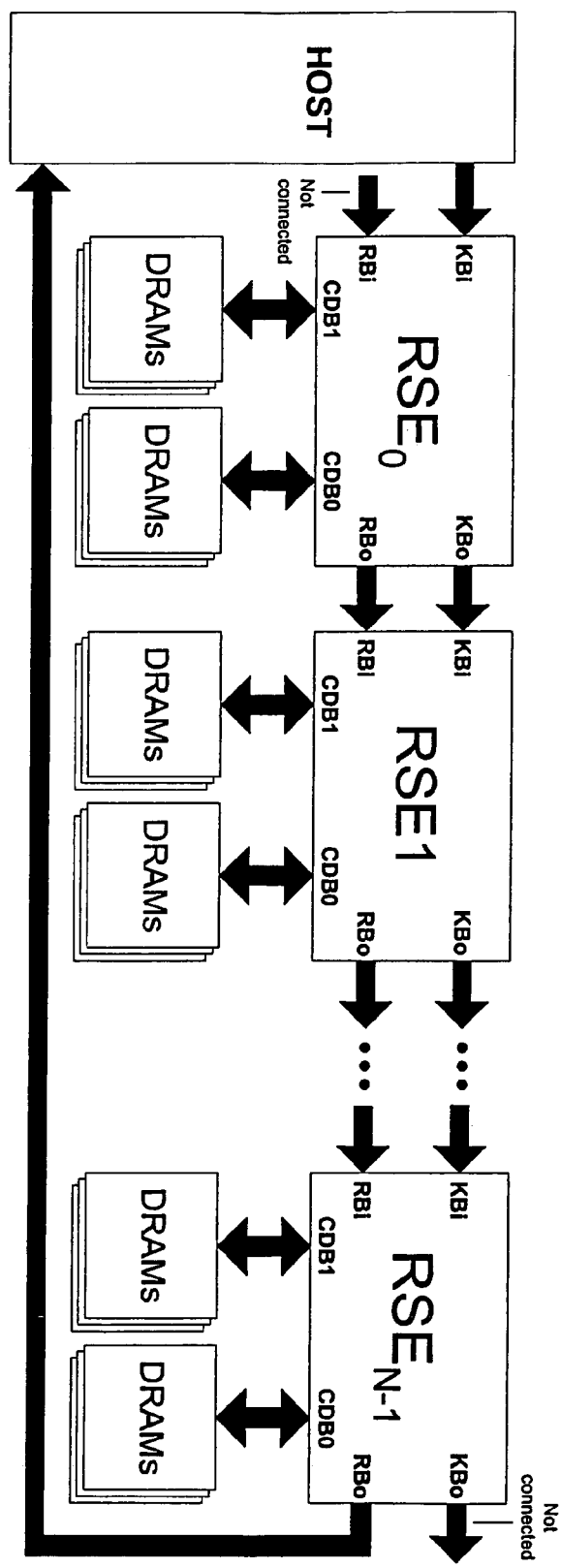
FIG. 4 is a schematic diagram depicting N RSEs in a forward-result concatenation configuration, according to one embodiment of the present invention.

Two configurations of concatenated RSEs are described below—forward and backward result concatenations. FIG. 4 shows N RSEs in a forward result concatenation configuration. In this configuration, the search results obtained in each RSE, starting from the first RSE ($RSE_0$), are transferred forward to the succeeding RSE, which concatenates them with its own search results and passes the concatenated results to the succeeding RSE, and so on. The last ($RSE_{N-1}$) outputs the concatenated search results to the NPU.

The RSEs preferably have the same (modular) structure, but are configured for searching different multiple-field keys. The Input Key Bus (KBi) of the first RSE ($RSE_0$) carries the commands and the submitted multi-dimensional keys from the NPU to the RSE chain. The system is configured such that the Output Key Bus (KBo) of $RSE_0$ is directly connected to the Input Key Bus of the second RSE (RSEI), and so on up to the last RSE ($RSE_{N-1}$); the Output Key Bus (KBo) of $RSE_{N-1}$ is not connected. Consequently, the Output Key Bus (KBo) of $RSE_0$ passes the commands and submitted keys directly to the Input Key Bus of the second RSE ($RSE_1$), and so on up to the last RSE ($RSE_{N-1}$).

As used herein in the specification and in the claims section that follows, the term "directly connected", with respect to a plurality of individual search engines (e.g., RSEs) refers to individual search engines configured such that the submitted keys are transferred from an individual search engine to a succeeding individual search engine in a direct manner, i.e., not routed via a supervisory co-processing unit.

As used herein in the specification and in the claims section that follows, the term "supervisory co-processing unit" and the like, refers to a co-processing unit that is logically disposed between an ASIC and at least two search engines, and distributes processor-intensive tasks among these at least two search engines so as to improve ASIC performance.

The Output Result Bus (RBo) of $RSE_0$ passes the search results obtained in $RSE_0$ to the Input Result Bus (RBi) of $RSE_1$, which concatenates them with its own search results and passes the concatenated results to the Input Result Bus of $RSE_1$, and so on up to the last RSE ($RSE_{N-1}$), which carries the concatenated search results to the NPU. The Input Result Bus of $RSE_0$ is not connected. In this configuration, only the Input Key Bus of $RSE_0$ and the Output Result Bus of $RSE_{N-1}$ are connected to the NPU. This reduces the NPU pin count, makes the board design easier and maximizes the use of the bus bandwidth. The RSE chain configured in forward result concatenation can easily perform multiple-task operations, where each field or dimension is searched separately of other dimensions, each search result being unrelated to other results. Multi-dimensional search operations (where the concatenated results are "Cartesian multiplications" of one-dimensional results) can also be implemented with relative ease when performed in a single RSE, but are difficult to achieve when the search operations require more than one RSE.

Figure 5:
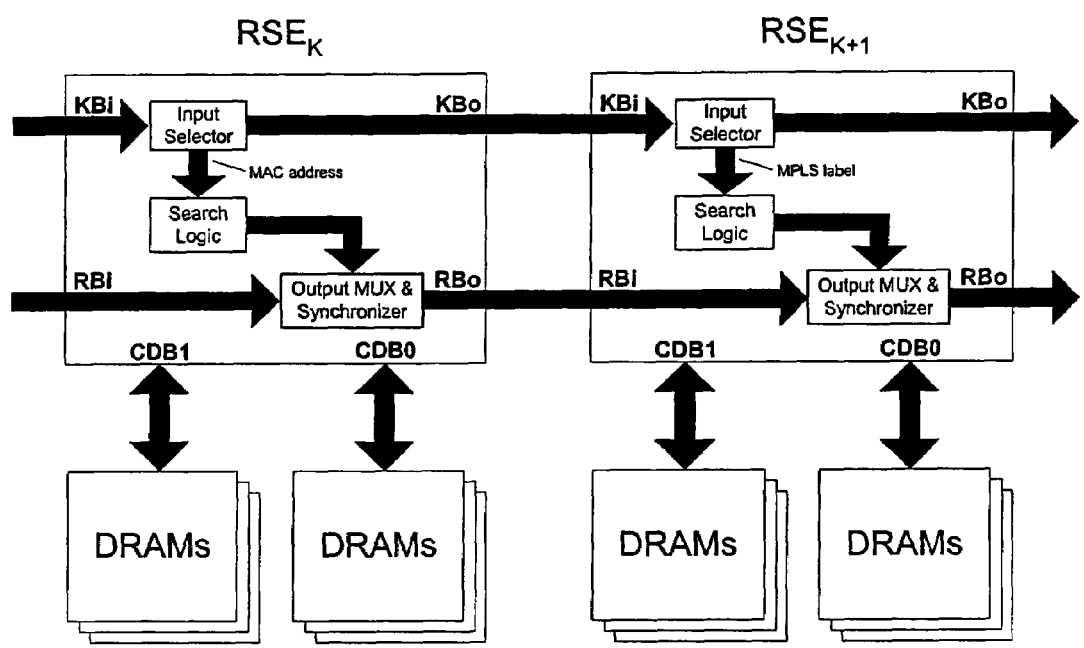
FIG. 5 is a schematic diagram depicting two sequential RSEs within a forward-result concatenation chain configured to search two exemplary fields of a PHK.

FIG. 5 shows schematically two sequential RSEs within a chain configured to search (as an example) two fields of a PHK: MAC addresses and MPLS labels. The Input Key Bus (KBi) carries the commands and the submitted keys from the NPU to all the RSEs. An Input Selector selects the pertinent fields to be searched by the specific RSE, and passes on all the commands and the submitted keys to the succeeding RSEs. The Parsing Unit in the Input Selector receives the selected fields, and selects and orders accordingly the relevant fields to compose a Synthesized Key. Each field of the Synthesized Key is searched by the Search Logic in an internal memory or in an external DRAM connected to the RSE. If a key is found, the corresponding Associated Data is retrieved as a result. An OMS multiplexes and synchronizes the search results of the specific RSE with the search results of all the preceding RSEs arriving on the Output Result Bus of the contiguous preceding RSE, to provide a concatenated set of results to the contiguous succeeding RSE. As mentioned before, the Output Result Bus of the last RSE ($RSE_{N-1}$) carries the concatenated search results from all the RSEs to the NPU. FIG. 5 exemplifies a two-task operation, because the MAC addresses and MPLS labels are searched separately and the search results are mutually independent.

Figure 6:
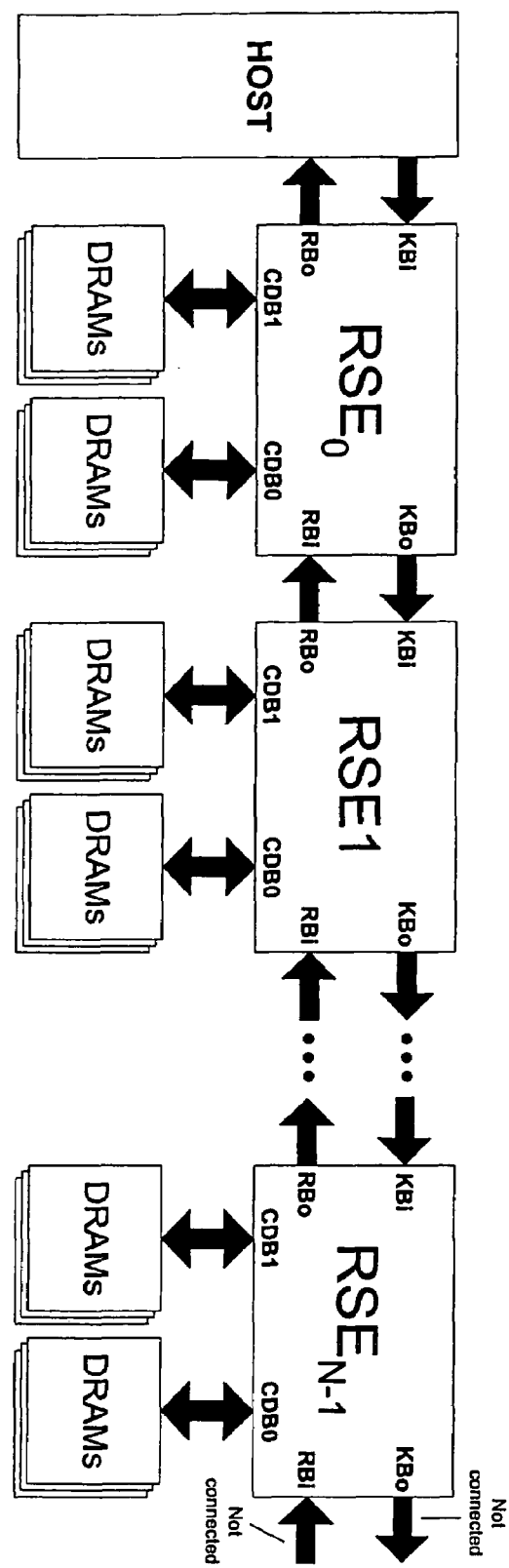
FIG. 6 is a schematic diagram depicting N RSEs in a backward-result concatenation configuration, according to another embodiment of the present invention.

FIG. 6 shows a second configuration of N concatenated RSEs, similar to the configuration shown in FIG. 4. As in the previous configuration, all the RSEs have the same inputs/outputs, are configured for searching different multiple-field keys, and can concurrently handle one or more PHKs. The difference in this configuration is that the Result Busses have a reverse direction with respect to the Key Busses: the Key Busses are directed forward from the NPU toward the last RSE ($RSE_{N-1}$), and the Result Busses are directed backward from $RSE_{N-1}$ toward the NPU. The Input Key Bus (KBi) of $RSE_0$ carries the commands and multi-dimensional keys from the NPU to the RSE chain. The Output Key Bus (KBo) of $RSE_0$ passes these commands and submitted keys to the Input Key Bus of $RSE_1$, and so on up to $RSE_{N-1}$; the Output Key Bus and Input Result Bus (RBi) of $RSE_{N-1}$ are not connected. The Output Result Bus (RBo) of the last RSE ($RSE_{N-1}$) passes the search results obtained in $RSE_{N-1}$ to the Input Result Bus (RBi) of the preceding RSE, $RSE_{N-2}$, which concatenates them with its own search results and passes the concatenated results to the Input Result Bus (RBi) of $RSE_{N-3}$, and so on down to $RSE_0$, which carries the concatenated search results to the NPU. In this configuration, only the first RSE ($RSE_0$) in the chain is connected to the NPU. This minimizes the NPU pin count and the board design complexity, maximizes the use of the bus bandwidth, and simplifies the synchronization of the search results for concatenation. This configuration also allows the addition of new RSE devices without changing the connection or configuration of the existing RSEs, providing easy scalability with minimal board changes. The RSE chain configured in backward result concatenation can easily perform multiple-task operations (in which each field or dimension is searched separately and each search result is unrelated to other results). Even the above-described multi-dimensional search operations involving more than one RSE can be achieved with relative ease by "looping" the search results of the involved RSEs using the connecting Key and Result Busses, and reprocessing these search results to obtain multi-dimensional dependency.

Figure 7:
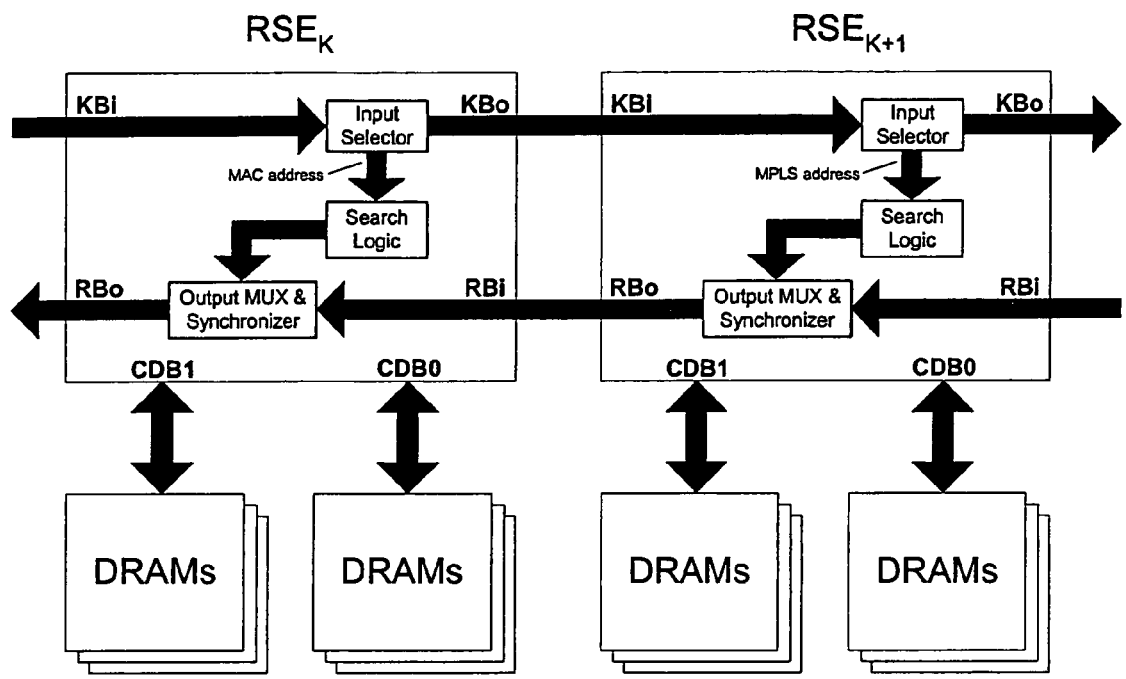
FIG. 7 is a schematic diagram depicting two sequential RSEs within a backward-result concatenation chain configured to search MAC addresses and MPLS labels.

FIG. 7 is a schematic diagram depicting two sequential RSEs within a backward-result concatenation chain configured to search MAC addresses and MPLS labels. The Input Key Bus (KBi) carries the commands and the submitted keys from the NPU to all the RSEs. The Input Selectors and Search Logic operate as in the forward result concatenation embodiment described hereinabove. Each Input Selector selects the pertinent commands and the keys to be searched by the specific RSE, and passes on all the commands and the submitted keys to the succeeding RSEs. The Parsing Unit in the Input Selector uses the selected commands and keys to construct a Synthesized Key. Each field of the Synthesized Key is searched by the Search Logic in an internal memory or in an external DRAM connected to the RSE. If a key is found, the corresponding Associated Data is retrieved in response. The OMS devices operate in reverse direction as compared to the forward result concatenation. Each OMS multiplexes and synchronizes the search results of the specific RSE with the search results of all the succeeding RSEs arriving on the Output Result Bus (RBo) of the contiguous succeeding RSE, to provide a concatenated set of results to the contiguous preceding RSE. The Output Result Bus of $RSE_0$ carries the concatenated search results from all the RSEs to the NPU. FIG. 7 (as in FIG. 5 for forward result concatenation) exemplifies a two-task operation, because the MAC addresses and MPLS labels are searched separately and the search results are mutually independent.

Figure 8:
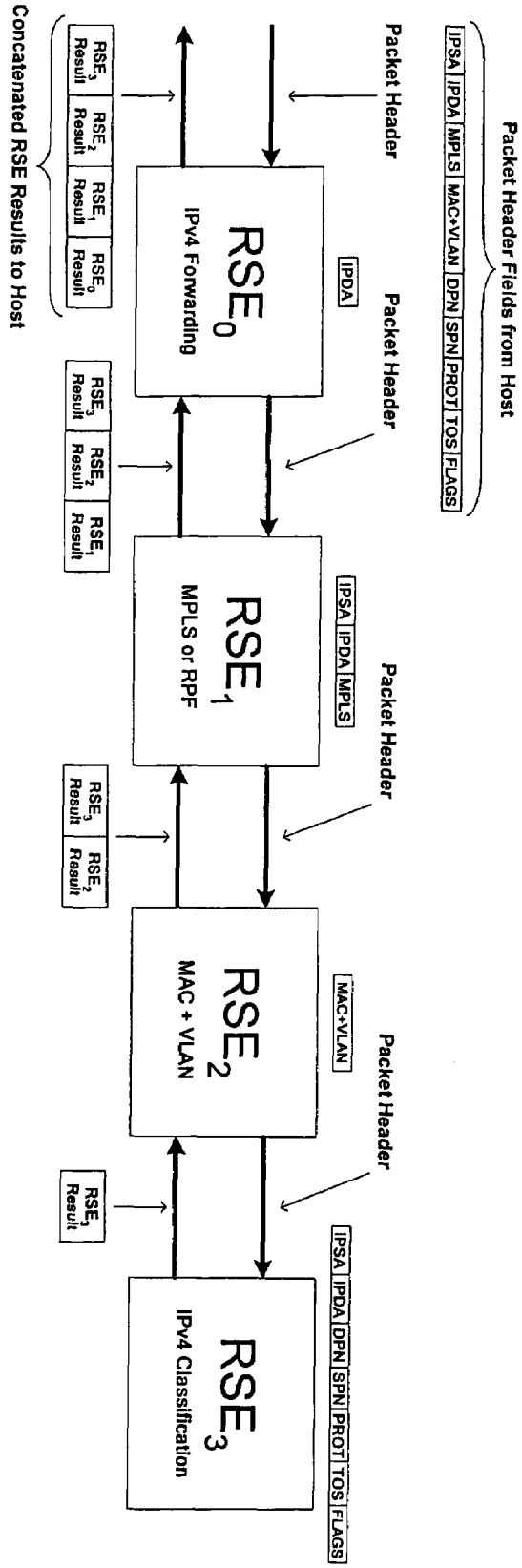
FIG. 8 provides an exemplary diagram showing Key Synthesis and backward-result concatenation in a chain of four RSEs used to search a 9-field PHK and perform several multi-dimensional search operations for forwarding and classification.

FIG. 8 provides an exemplary diagram showing Key Synthesis and backward result concatenation in a chain of four RSEs used to search a 9-field PHK. In this example, the RSE chain performs several multi-dimensional search operations for forwarding and classification. Specifically, $RSE_3$ performs multidimensional search operations for IPv4 classification. The first four fields handled by $RSE_3$ (IPSA, IPDA, DPN and SPN) contain ranges of integers, whereas the last three fields (PROT, TOS and FLAGs) contain single-valued (exact) integers.

Figure 9:
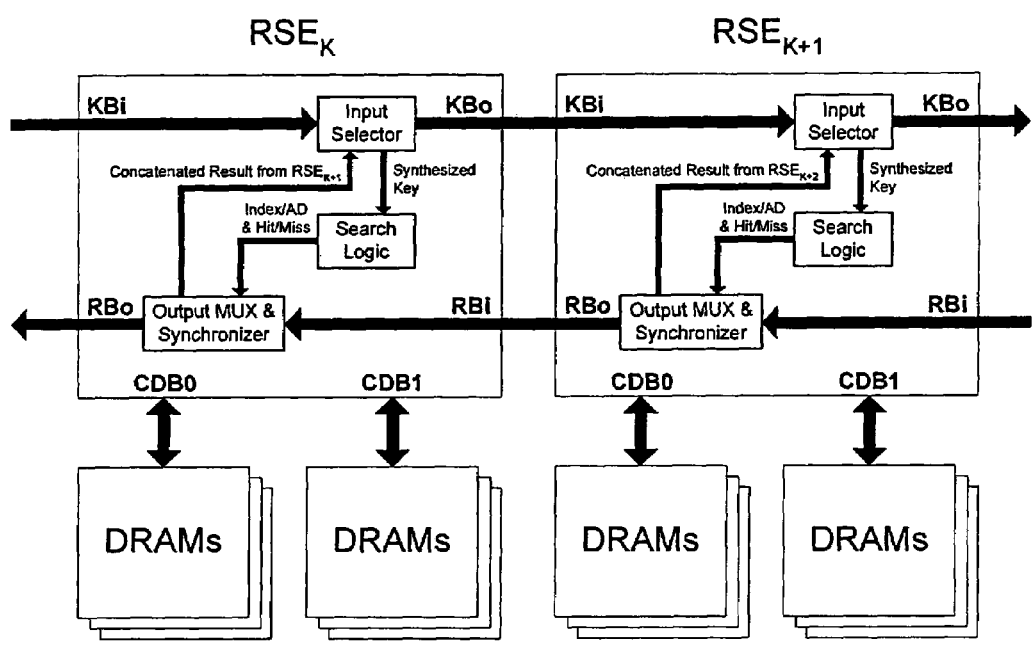
FIG. 9 is a schematic diagram depicting two sequential RSEs within a backward-result concatenation chain in which the RSEs are "looped" and configured to perform multidimensional search operations.

FIG. 9 is a schematic diagram depicting two sequential RSEs within a backward-result concatenation chain that are "looped" and configured to perform multi-dimensional search operations. The Input Key Bus (KBi) carries the commands and the submitted keys from the NPU to all the RSEs. Each Input Selector selects the pertinent commands and the keys to be searched by the specific RSE, and passes on all the commands and the submitted keys to the succeeding RSEs. The Parsing Unit in the Input Selector uses the selected commands and keys to compose a Synthesized Key. Each field of the Synthesized Key is searched by the Search Logic in an internal memory or in an external DRAM connected to the RSE. If a key is found, the corresponding Associated Data is retrieved in response. Each OMS multiplexes and synchronizes the search results of the specific RSE with the search results of all the succeeding RSEs arriving on the Output Result Bus (RBo) of the contiguous succeeding RSE, to provide a concatenated set of results to the contiguous preceding RSE. In the "loop" configuration, the concatenated result of $RSE_{K+2}$ that passes to the OMS of $RSE_{K+1}$ is transferred to the Input Selector of $RSE_{K+1}$, and, similarly, the concatenated result of $RSE_{K+1}$ passes from the OMS of $RSE_K$ to the Input Selector of $RSE_K$; this allows the reprocessing of the Synthesized Keys in the Input Selectors of $RSE_K$ and $RSE_{K+1}$ taking into account the concatenated result of $RSE_{K+1}$ and $RSE_{K+2}$, respectively. The reprocessed results in $RSE_K$ and $RSE_{K+1}$ can be looped back on their Output Key Busses in the (contrary) forward direction to $RSE_{K+1}$ and $RSE_{K+2}$, respectively. Thus, in "loop" configuration, search results of two or more RSEs can be reprocessed as necessary to implement multidimensional search (for multi-dimensional classification) or other multi-dimensional processing operations.

Figure 10:
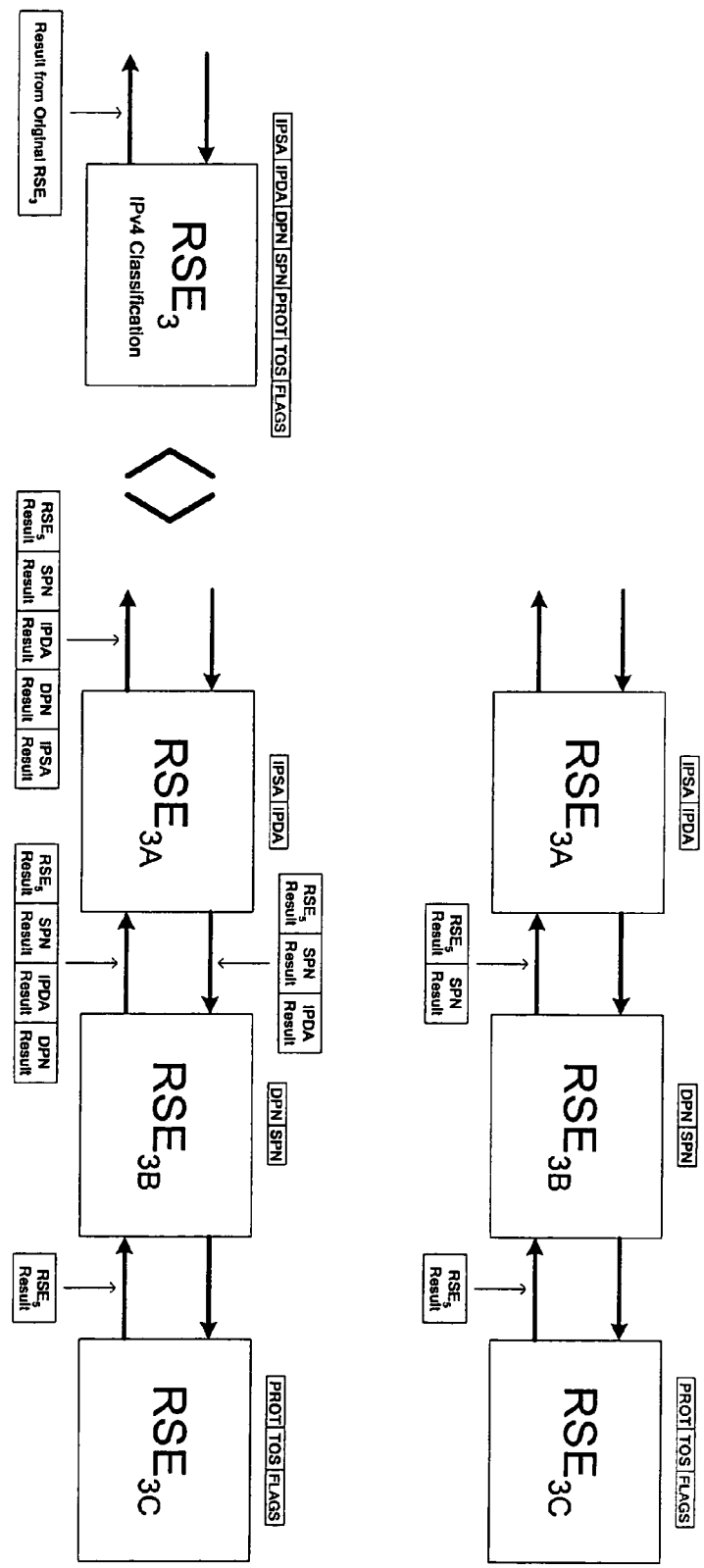
FIG. 10 is a schematic diagram depicting a configuration in which the search operations performed by $RSE_3$ in FIG. 8 are performed, instead, using three RSEs.

FIG. 10 shows two stages in an example of multi-dimensional search operations involving three RSEs, where the search results of the first two RSEs are "looped" in the configuration depicted in FIG. 9. This example depicts one way in which the search operations performed by $RSE_3$ in FIG. 8 can be performed using, instead, three RSEs, $RSE_{3A}$ to $RSE_{3C}$. In the option selected, the last three exact fields are integrated into one compound exact field that is classified by the last RSE ($RSE_{3C}$). The other two RSEs handle the first four range fields; in this case, $RSE_{3A}$ handles the IPSA and IPDA fields, and $RSE_{3B}$ classifies the DPN and SPN fields.

The Input Selector of $RSE_{3C}$ selects the PROT, TOS and FLAGs fields of the submitted key, and composes a Synthesized Key. The Search Logic receives the Synthesized Key and sequentially searches each of the fields in a relevant list of keys. Each search points to a location in a memory associated with the RSE. If a key is found, the corresponding Associated Data is retrieved in response. As the concatenated search result depends on each field or dimension, each retrieved Associated Data is used to tag the next field to be searched. In this example, $RSE_{3C}$ performs three one-dimensional, exact search operations of the PROT, TOS and FLAGs fields in the respective tables and concatenates the search results by tagging to yield a 3-dimensional exact result. Then, the concatenated result from $RSE_{3C}$ (consisting of the FLAGs/TOS/PROT search results) passes to $RSE_{3B}$, where the SPN field is searched, the search result is concatenated with the result from $RSE_{3C}$ and the concatenated $RSE_{3C}$/SPN result is passed to $RSE_{3A}$. $RSE_{3A}$ searches for the IPDA field, concatenates the search result with the concatenated $RSE_{3C}$/SPN result arriving from $RSE_{3B}$, and loops the concatenated $RSE_{3C}$-SPN/IPDA result (on the Output Key Bus) in the (contrary) forward direction back to $RSE_{3B}$. $RSE_{3C}$ searches for the second field, DPN, concatenates the search result with the concatenated result from $RSE_{3A}$ and passes the concatenated $RSE_{3C}$/SPN/IPDA/DPN result in the usual backward direction to $RSE_{3A}$. $RSE_{3B}$ searches for the remaining field, IPSA, concatenates the search result with the concatenated result from $RSE_{3B}$ and transfers the concatenated $RSE_{3C}$/SPN/IPDA/DPN/IPSA result in backward direction to the preceding RSE in the chain, i.e., $RSE_2$ (see FIG. 8).

The capability of "looping" RSEs in backward result concatenation is advantageous, allowing a tradeoff between the number of RSEs and the number of loops in the result concatenation, providing great flexibility with regard to the storage and search sequence of multidimensional databases.

The RSEs are logically arranged in series. However, because the search task times are generally much longer (at least 1-3 orders of magnitude) than either the transfer of the commands and submitted keys between the RSEs or the transfer and concatenation of the search results (both of which typically take only up to a few clock cycles), practically, the processing takes place in parallel.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A packet co-processing system for improving the performance of an Application Specific Integrated Circuit (ASIC), the system comprising:
   a set of N search engines, logically disposed so as to form a chain of search engines, said set of search engines including:
   (a) a first search engine for connecting to the ASIC;
   (b) a terminal search engine, operatively connected with said first search engine, and
   (c) a set of N−2 intermediate search engines, logically disposed between said first search engine and said terminal search engine,
   wherein N is an integer=2, and
   wherein each particular search engine in said chain of search engines includes:
   (i) an input selector including a parsing unit configured to:
      (A) select a particular set of fields containing at least a portion of at least one field, from a larger, first set of fields submitted to said particular search engine, and
      (B) produce a Synthesized Key using data from said particular set of fields;
   (ii) search logic configured to:
      (A) search a memory, in response to said Synthesized Key, for a key entry matching said Synthesized Key, and
      (B) retrieve, from said memory, associated data corresponding to said Synthesized Key, and
   (iii) an output unit configured to output said associated data from said particular search engine,
   wherein said chain is further configured such that each output unit of each said intermediate search engine, and at least one output unit of said first search engine and said terminal search engine, output said associated data to an adjacent search engine in said chain,
   and wherein said chain is further configured such that said input selector of each said intermediate search engine, and at least one input selector of said first search engine and said terminal search engine, output a second set of fields, including at least a portion of said first set of fields, to an adjacent search engine in said chain.

2. The system of claim 1, wherein N=2, and wherein said terminal search engine is directly connected to said first search engine.

3. The system of claim 1, wherein N>2, and wherein an intermediate search engine of said intermediate search engines is directly connected to said first search engine.

4. The system of claim 1, wherein N>2, and wherein solely one intermediate search engine of said intermediate search engines is directly connected to said first search engine.

5. The system of claim 1, wherein N>2, and wherein said terminal search engine is directly connected to a preceding search engine of said intermediate search engines.

6. The system of claim 1, wherein each output unit of each said intermediate search engine, and at least one output unit of said first search engine and said terminal search engine, includes an output multiplexer & synchronizer (OMS).

7. The system of claim 3, wherein up to two of said first, said intermediate, and said terminal search engines are for directly connecting to the ASIC.

8. The system of claim 3, wherein said terminal search engine is directly connected solely to one search engine of said intermediate search engines.

9. The system of claim 3, wherein said terminal search engine is directly connected to the ASIC, such that said output unit of said terminal search engine is configured to output said associated data from said terminal search engine, via an output bus, directly to the ASIC.

10. The system of claim 3, wherein said output unit of said terminal search engine is configured to output said associated data from said terminal search engine, via an output bus, to an immediately preceding search engine in said chain of search engines.

11. The system of claim 1, wherein said first search engine is directly connected to a single search engine.

12. The system of claim 1, wherein said first set of fields and said second set of fields are identical.

13. The system of claim 1, wherein said second set of fields contains all of said first set of fields.

14. The system of claim 1, wherein the ASIC is a network processing unit (NPU).

15. The system of claim 6, wherein said OMS is designed and configured to multiplex and synchronize said associated data from said first search engine with said associated data from a succeeding search engine to produce a concatenated set of results.

16. The system of claim 6, wherein N>2.

17. The system of claim 16, wherein a particular OMS of a particular search engine in said chain of search engines is designed and configured to multiplex and synchronize said associated data from at least one preceding search engine in said chain with said associated data from said particular search engine so as to produce a concatenated set of results.

18. The system of claim 17, wherein said output unit of said particular search engine is configured to output said concatenated set of results to an adjacent search engine in said chain.

19. The system of claim 18, wherein said search logic of said adjacent search engine is configured to search at least a portion of said concatenated set of results.

20. The system of claim 1, wherein said parsing unit includes programmable registers.

21. The system of claim 1, wherein said parsing unit includes programming files.

22. The system of claim 1, wherein said memory of said first search engine and said memory of said terminal search engine are dedicated memories that serve a single search engine.

23. The system of claim 1, wherein said memory of any said particular search engine is disposed within said particular search engine.

24. The system of claim 1, wherein said memory of any said particular search engine is disposed outside of said particular search engine.

25. The system of claim 1, wherein said input selector is designed and configured to output said second set of fields before, or in parallel with, production of said Synthesized Key.

26. The system of claim 1, wherein said input selector is designed and configured to output said second set of fields within a few clock cycles, such that said output of said second set of fields is completed before, or in parallel with, production of said Synthesized Key.

27. The system of claim 1, wherein said data corresponding to said Synthesized Key includes field location data.

28. The system of claim 1, wherein said first search engine and said set of intermediate search engines have an identical hardware structure.

29. The system of claim 1, wherein said terminal search engine and said set of intermediate search engines have an identical hardware structure.

30. The system of claim 1, wherein said first set of fields includes a multiple-field Packet Header Key.

31. The system of claim 6, wherein said first search engine, each said intermediate search engine, and said terminal search engine are logically disposed in a forward result concatenation configuration, wherein search results obtained in each said search engine, starting from said first search engine, are transferred forward to an immediately succeeding search engine, and wherein said OMS of said succeeding search engine is designed and configured to multiplex and synchronize said search results with search results from said succeeding search engine to produce a concatenated set of results, which are then output to a next immediately succeeding search engine.

32. The system of claim 31, wherein said terminal search engine is configured to output concatenated results to the ASIC.

33. The system of claim 6, wherein said first search engine, each said intermediate search engine, and said terminal search engine are logically disposed in a backward result concatenation configuration, wherein search results obtained in each said search engine, starting from said terminal search engine, are transferred backward to an immediately preceding search engine, and wherein said OMS of said preceding search engine is designed and configured to multiplex and synchronize said search results with search results from said preceding search engine to produce a concatenated set of results, which are then output to a next immediately preceding search engine.

34. The system of claim 33, wherein said first search engine is configured to receive concatenated results from a succeeding search engine in said chain, and wherein an OMS of said first search engine is designed and configured to multiplex and synchronize search results with said concatenated results from said succeeding search engine to produce a concatenated set of results, and to output said concatenated set of results to the ASIC.

35. The system of claim 31, wherein N>2.

36. The system of claim 32, wherein N>2.

37. The system of claim 33, wherein N>2.

38. The system of claim 34, wherein N>2.

\* \* \* \* \*